Feb. 12, 1924.
W. J. MORSE
BELT BUCKLE
Filed Aug. 24, 1923
1,483,236
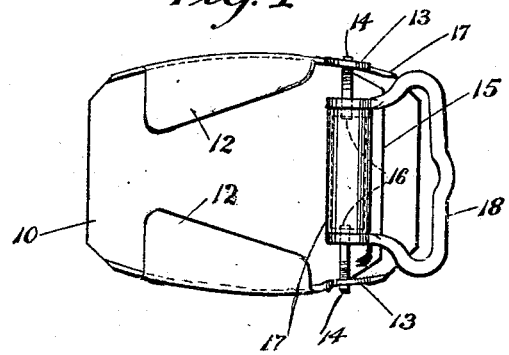
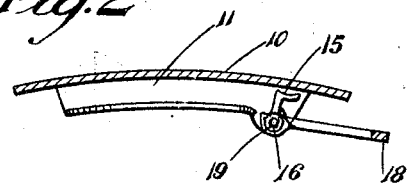
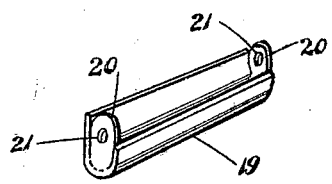
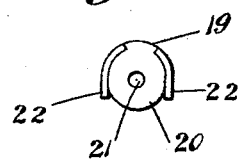
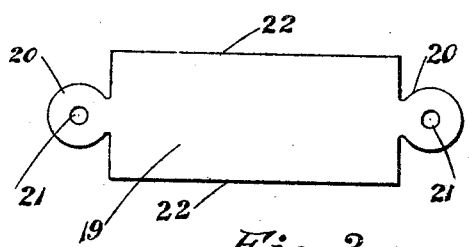
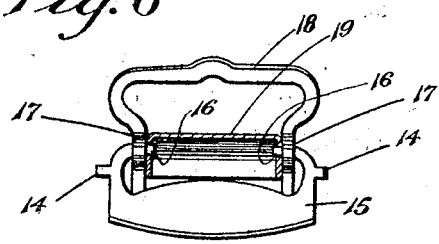
Inventor
William J. Morse
By
Attorney Patented Feb. 12, 1924.

1,483,236

UNITED STATES PATENT OFFICE.

WILLIAM J. MORSE, OF ATTLEBORO, MASSACHUSETTS.

BELT BUCKLE.

Application filed August 24, 1923. Serial No. 659,090.

*To all whom it may concern:*

Be it known that I, WILLIAM J. MORSE, a citizen of the United States, residing at Attleboro, in the county of Bristol and State of Massachusetts, have invented certain new and useful Improvements in Belt Buckles, of which the following is a specification.

This invention relates to improvements in belt buckles of that class in which a clamp member is pivotally mounted in the body to engage and bind the belt therein and in which the bail member is pivotally connected to the clamp; and the object of this invention is to provide a guard member for locking the bail on its pivots where it is connected to the clamp.

With these and other objects in view, the invention consists of certain novel features of construction, as will be more fully described, and particularly pointed out in the appended claims.

In the accompanying drawings:—

Figure 1 is a view of the inner face of my improved buckle showing the guard positioned to lock the ends of the bail on its pivot pins.

Figure 2 is a central sectional edge elevation showing the guard member mounted on the bail pivot pins.

Figure 3 is a view showing the general form of the blank from which my improved guard member is constructed.

Figure 4 is a perspective view showing the blank as folded up into trough shape with pierced, inwardly-projecting end members.

Figure 5 is an end view of the guard member.

Figure 6 is a sectional side elevation showing my guard member as set in between the spaced apart ends of the bail and engaging the inturned pivot pins to lock the bail ends thereon.

It is found in practice in the use of buckles of the construction where the bail is pivoted onto the clamping member, that where excessive strain is exerted upon the bail its ends are sprung inwardly and so released from its pivot pins, and to obviate the possibility of this occurring, I have provided a guard member which sets in between the bail ends and is held in position by being sprung over the inwardly-extending ends of the bail pivots to effectually prevent the ends of the bail from springing inwardly and becoming disengaged therefrom; and the following is a detailed description of one construction by which this result may be accomplished:—

With reference to the drawings, 10 designates the body of a buckle which is provided with rearwardly-turned edge walls 11, which walls are shown as having inturned flanges 12 for guiding the belt in the body of the buckle. At one end of each of these flanges, I have provided a rearwardly extending ear 13 which is pierced to receive the laterally and outwardly extending pivot pins 14 formed on the clamp member 15 by which the clamp is operatively connected to the buckle.

This clamp member is also provided with a pair of inturned pivot pins 16 which extend toward each other, and on these latter pins, I have mounted to swing the spaced-apart ears 17 of the swinging bail 18 to which bail one end of the belt is fixed.

In some instances it is found when excessive strain is applied by the belt to this bail member, that its ends 17 have a tendency to spring inwardly and become disengaged from the pivot ends 16, and to obviate this difficulty, I have provided a guard member 19 for supporting the bail ends against such inward springing action.

This guard member may be made in any suitable way and of any suitable material, but I preferably form the same from a blank of sheet metal, as illustrated in Figure 3, having a pair of end ears 20 pierced at 21 and which when turned inwardly fit over the pivot pins 16 on the clamp. The edges 22 of the body portion of this guard are then rolled inwardly about these ears forming a trough-shaped member, as illustrated in Figure 4.

The body of this guard member is formed of a length to just fit in between the spaced apart ears 17 of the bail 18, and by bending these ears 20 of this guard inwardly they are caused to spring over the ends of the pivot pins causing these pins to extend through the pierced eyes 21 thereof thus securely retaining this guard in position between the pivoted ends of the bail and the guard thus positioned serves to effectually prevent the bail ends from being sprung inwardly and disconnected from its pivots.

My improved guard for locking the pivot ends of the bail onto its pivot pins, is very simple in construction and effective in its operation and by its use the bail is effectually locked in position and is prevented from disengagement with its pivot ends.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:—

1. A buckle comprising a body portion, a clamping member pivotally mounted in said body to engage and bind a belt therein, a bail member pivotally connected to said clamping member, and means between the pivoted ends of said bail member for preventing said pivoted ends from being inadvertently disconnected from its pivots.

2. A buckle comprising a body portion, a clamping member pivotally mounted in said body to engage and bind a belt therein, a bail member pivotally connected to said clamping member, and a guard extending between the pivoted ends of the bail to prevent said pivoted ends from being inadvertently disconnected from its pivots.

3. A buckle comprising a body portion, a clamping member pivotally mounted in said body to engage and bind a belt therein, a pair of inturned pivot pins on said body, a bail member mounted to swing on said pins, and a guard member also mounted on said pins to assist in locking said bail thereon.

4. A buckle comprising a body portion, a clamping member pivotally mounted in said body to engage and bind a belt therein, a pair of inturned pivot pins on said body, a bail member having spaced apart pivot ears, and a guard member having a body portion of a length to set in between said pivot ears and having pierced inturned end members to be sprung over the inwardly projecting ends of said pivot pins.

5. A buckle comprising a body portion, a clamping member pivotally mounted in said body to engage and bind a belt therein, a pair of inturned pivot pins on said clamping member, a bail member having spaced apart pierced pivot ears, and a guard member formed of sheet stock folded into trough shape and of a length to fit in between the pivot ears of said bail, and the end members of said guard being pierced and adapted to be sprung over the ends of said pivot pins to lock the pivoted ends of said bail thereon.

In testimony whereof I affix my signature.

WILLIAM J. MORSE.